United States Patent [19]

Wang et al.

[11] 4,090,758

[45] May 23, 1978

[54] METHOD OF REGENERATING A LEAD MONOXIDE TARGET LAYER OF A CAMERA TUBE

[75] Inventors: Chih Chun Wang, Hightstown; Thomas Clifford Lausman, Cranbury; Ronald Frank Bates, Trenton, all of N.J.

[73] Assignee: RCA Corporation, New York, N.Y.

[21] Appl. No.: 761,447

[22] Filed: Jan. 21, 1977

Related U.S. Application Data

[62] Division of Ser. No. 663,624, Mar. 3, 1976, abandoned.

[51] Int. Cl.² .................................................. H01J 9/50
[52] U.S. Cl. ........................................................ 316/2
[58] Field of Search ................................. 316/2, 1, 25

[56] References Cited

U.S. PATENT DOCUMENTS

| 3,515,927 | 6/1970 | De Haan et al. .............. 313/481 X |
| 3,795,432 | 3/1974 | Goldstein ............................. 316/2 |

*Primary Examiner*—Richard B. Lazarus
*Attorney, Agent, or Firm*—E. M. Whitacre; G. H. Bruestle; R. M. Rodrick

[57] ABSTRACT

The method comprises the steps of providing a camera tube having an evacuated envelope, a photoconductive layer primarily of lead monoxide, an activated getter and an unactivated getter within the envelope. After a period of operation or storage the tube exhibits a deterioration in spectral photosensitivity of the layer. The characteristic ratio of blue light photosensitivity is measured and when the ratio is less than about 80% the unactivated getter is activated to regenerate the tube.

1 Claim, 2 Drawing Figures

METHOD OF REGENERATING A LEAD MONOXIDE TARGET LAYER OF A CAMERA TUBE

This is a division of application Ser. No. 663,624, filed Mar. 3, 1976, now abandoned.

BACKGROUND OF THE INVENTION

The invention relates to camera tubes of the type including a photoconductive target layer comprising, primarily lead monoxide. More specifically, it relates to such camera tubes, which include internal means for regenerating the target layer to restore or reestablish desired spectral sensitivity characteristics which have deteriorated in the course of time by use, or by storage.

Camera tubes of the vidicon type having targets comprising a layer primarily of lead monoxide have been widely used for TV pickup. Such target layers have a p-i-n junction structure with the scan side of the layers exhibiting a p-type conductivity. Such camera tube targets are more fully described in an article by E. F. deHaan, A. van der Drift, and P. P. M. Schampers entitled "The Plumbicon, a new television camera tube" in *Philips Technical Rev.* 25, 133–151 (1963/64).

It is well known that after a number of operational hours there is a gradual deterioration of the spectral sensitivity of the camera tubes described, particularly at the blue end of the sensitivity range. The deterioration described may also occur during a period of storage.

One desired characteristic for targets used in vidicons of the type described is a relative insensitivity of its target layer to changes in the magnitude of a reverse bias voltage connected across that layer. Tubes having an excessive change in photosensitivity to such voltage changes when light within the blue region of the light spectrum is focused upon that layer may be said to display "blue slump". Generally, tubes which have displayed the deterioration previously described, also display, in operation, a blue-slump characteristic. These tubes thereafter display, by continued operation, other still more serious defects such as an inadmissibly high dark current which make them unusable. Thus, the degree of "blue slump" displayed by such tubes is used as a leading indication of device failure.

The development of poor blue operation characteristics leading to a dark current breakdown mode of failure is caused by the degradation of the hole transport properties of the target layer. This degradation may be due to loss of oxygen and/or water from the target layer. The degradation is also believed to be due to the formation of excessive hole traps in the target layer. These traps are believed to be generated by crystalline defects and/or impurity states in the surface and/or bulk produced by contaminating vapor species resulting from photoelectronic processes in the tube envelope. During operation and/or storage of such tubes, vapor species such as oxygen, hydrogen, water and hydrocarbons are transferred from the target layer to the space in the tube. These vapor species, theoretically, are absorbed by the barium which has condensed along the interior wall surface of the tube envelope as a result of the flashing of the conventional barium getter in the tube during manufacture.

The flashing of a single evaporable type barium getter during manufacture is well known in the art. Such getters are ordinarily activated subsequent to the formation of target layers and seal-off of the tubes, to clean up or absorb gases which are released from the materials of the respective tube structures. In this manner, lower pressures can be obtained within the tubes than can be obtained with pumps alone.

One approach to reestablish desired spectral sensitivity of lead monoxide target layers is described in U.S. Pat. No. 3,515,927 issued to E. F. deHaan on June 2, 1970. Disclosed therein is a method of regeneration in which a gas atmosphere having a single active constituent, a gas of the group of oxygen, water vapor, and mixtures thereof, is caused to act upon the target layer. The gas may be supplied through the exhaust tubulation or by means of a preparation incorporated within the tube capable of generating such a gas. The gas is allowed to act upon the target layer for some time and the tube is thereafter gettered. Such an approach requires exacting control to avoid chemical contamination of the target layer, cathode or other parts within the envelope. Furthermore, where gas evolving materials are incorporated within the envelope, difficulty is encountered in providing controlled heating of that material.

A simple and inexpensive approach for regenerating degenerated lead monoxide type target layers is desired, particularly for hole transport characteristics not solely degraded by excessive loss of oxygen and water.

SUMMARY OF THE INVENTION

A camera tube having a target layer comprising primarily lead monoxide includes a means for regenerating that layer to reestablish desired spectral sensitivity after a period of operation or storage. The target layer may be regenerated by activating at least one getter within the tube subsequent to the occurrence of undesirable spectral sensitivity changes.

DESCRIPTION OF THE PREFERRED EMBODIMENTS

Figure 1:
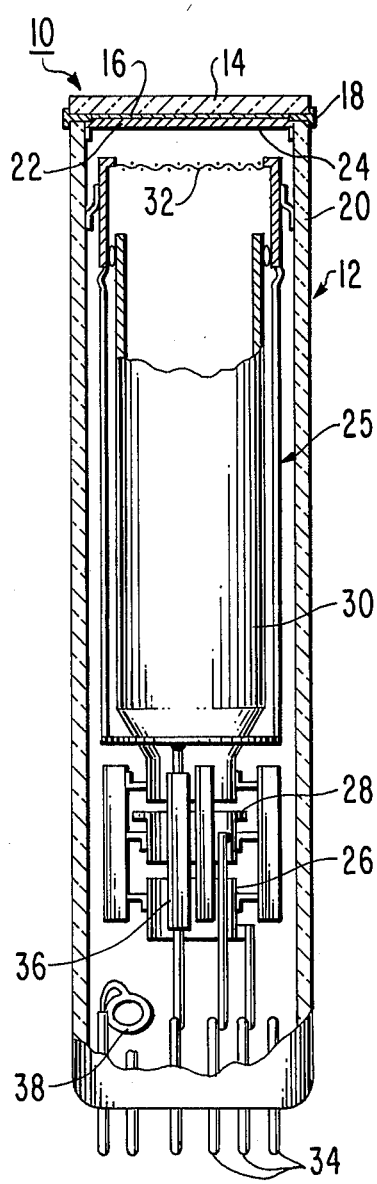
FIG. 1 is a cross-sectional cutaway view of a camera tube in accordance with the invention.

A preferred embodiment of the invention is a vidicon type camera tube 10, as shown in FIG. 1, having an evacuated envelope 12. A transparent faceplate 14 is at one end of the envelope 12, and includes a transparent conductive signal electrode 16 along its surface exposed within the interior of the envelope. The signal electrode 16 is connected to a conductive aluminum sealing ring 18, extending to the exterior of the envelope 12, which seals the faceplate 14 to an elongated bulb portion 20 of the envelope 12. A photoconductive target layer 22 comprising primarily lead monoxide is deposited or formed, in a manner well known in the art, on the signal electrode 16 such that a major surface 24 of that layer is exposed within the interior of the tube 10. An electron beam forming and scanning means 25, including an electron gun 26, grid electrodes 28 and 30, and the gauze-shaped electrode 32, is mounted longitudinally within the tube interior. A plurality of lead-in pins 34 extend through the end portion of bulb portion 20 opposite faceplate 14. The pins 34 are electrically connected to various internal electrodes of the tube 10 in a manner well known in the art.

In the operation of tube 10, the electron beam forming and scanning means 25 produces an electron beam which may be scanned across the exposed surface 24 of the target layer 22. Means (not shown) for magnetically focussing the electron beam to scan the surface 24 of the target may be positioned outside the envelope 12 in a manner well known in the art.

The tube 10 also includes an evaporable type pin getter 36 and a ring getter 38. The ring getter 38 may be of either an evaporable or non-evaporable type. Suitable evaporable type getter(s) may include, for example, a material composition of barium alone, or barium in combination with other metals such as aluminum, nickel, and/or magnesium. A suitable non-evaporable type ring getter 38, if provided, may include, for example, a zirconium powder such as in the ST-171 getter available from SAES Getters S.p.A. of Milano, Italy. Generally, the evaporable pin type getter 36 may consist of any of the getters which are well known in the art to be suitable for inclusion in electron discharge devices such as the SAES type ST-19/NC (pin type), or, alternatively may consist of an ST-140/o/9.554 (ring type) getter available from the same source.

Figure 2:
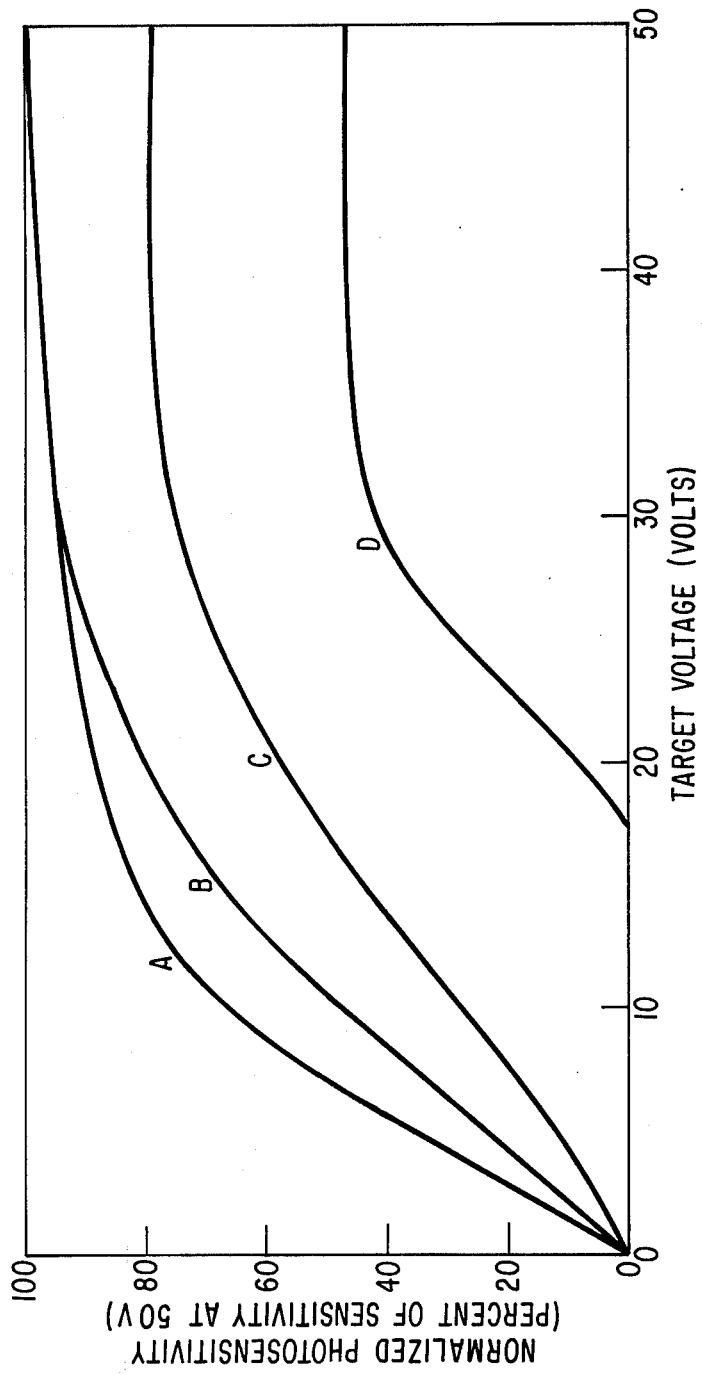
FIG. 2 is a graph depicting various typical blue light saturation characteristics relating the relative target photosensitivity to target operating voltage for various tubes which display differing degrees of degradation of their target layers.

Referring to FIG. 2, various degrees of "blue slump" deterioration are shown for several tubes "B", "C", and "D" in relation to a good tube "A" having the blue light saturation characteristics shown. The curves A–D depict relative target photosensitivities (with respect to the optimum camera operating voltage, 50 volts) for a given light source in the blue end of the light spectrum for various target voltages. Immediately subsequent to manufacture, "good" tubes are selected for sale having desirable blue light saturation characteristics similar to that shown for tube A. After many hours of operation, such tubes begin to display ever decreasing target photosensitivities at lower operating voltages. Thus, the blue light saturation characteristics display even greater sensitivity to the reverse bias target voltage as time proceeds. The tubes B–D depict typical stages of increasing deterioration of the target layer with time.

We have found that the continued blue slump degeneration of the target layer (which ultimately results in excessive dark current making the tube unusable), may be stopped and reversed (i.e. the layer may be "regenerated") by the simple expedient of activating one or more additional getters, such as getters 36 and/or 38 within the tube envelope subsequent to the occurence of such degeneration.

While variation has occurred in the degree of regenerative improvement which may be achieved by such gettering of the tube, the improvement has been found to be generally considerable. Generally, greater regeneration is obtained on less degenerated tubes. One measure of the degree of blue slump deterioration of the target layer is the characteristic ratio of the blue light photosensitivity at a target voltage of 25 volts to that at 50 volts. Typically, the optimum reverse bias target operating voltage of lead monoxide type camera tubes is about 50 volts. A typical good tube, at the time immediately following manufacture, has a characteristic ratio of about 80% or better. The occurrence of blue slump is indicated by a decrease in this ratio below about 80%. In one case the regenerative flashing of an evaporable type getter, such as the getter 36, within a deteriorated tube resulted in an improvement from an initial value of the characteristic ratio of about 65% to a value of about 87%. In another case, an improvement from an initial value of about 77% to the regenerated value of about 92% was achieved.

Evaporable type getters, such as getter 36, are activated by the process of "flashing" the getter, i.e. heating the getter by, for example, resistance heating methods well known in the art. A gettering phenomenon is accomplished by the adsorption of gas directly during evaporation and condensation of fresh getter metal along the interior side wall surface of the envelope 12 as a consequence of "flashing" and also by adsorption of gases on the freshly condensed getter-mirror-like surface formed by condensation along the interior wall surface of the envelope 12 after such "flashing". Nonevaporable bulk type getters, such as the ring getter 38, may also be provided within the tube as shown, for activation by, for example, RF heating methods, after the occurence of blue slump, to regenerate the target layer 22. Nonevaporable bulk type getters, similar to getter 38, are activated by controlled heating in excess of about 60° C. under a vacuum at a temperature for a period of time such that a thin protective film, which is formed along the surface of the getter material during air exposure after a sintering process, employed in the manufacture of the getter, is removed. The best activation conditions are reached at about 900°–1000° C.

In accordance with the invention, one or more unactivated getters 36 and/or 38 are provided in the tube 10 for activation subsequent to the occurrence of undesirable spectral sensitivity changes (blue slump) in the target layer as a means for regenerating that layer. These getters may be of the evaporable or nonevaporable type, and are in addition to any getters provided for activation during tube manufacture. In the preferred method of regeneration, a getter is activated subsequent to the occurrence of blue slump (i.e. when the blue light characteristic ratio is below about 80%) and when the dark current of the target layer approaches about 1 nA, for conventional lead monoxide camera tubes having a scanned area of about 2.2 cm.$^2$. Regeneration of target layers may, however, be accomplished whenever the dark current is between from about 1 to about 5 nA.

What we claim is:

1. A method of regenerating a camera tube which comprises:
   a. providing a camera tube, comprising:
      1. an evacuated envelope;
      2. a radiation sensitive photoconductive layer comprising primarily lead monoxide within said envelope, said layer, after a period of storage or operation, exhibiting degeneration of the characteristic ratio of the spectral photosensitivity of the layer, the characteristic ratio being determined by the ratio of the layer photosensitivity at a given layer operating voltage to the layer photosensitivity at a reference voltage;
      3. at least one activated getter within said envelope; and
      4. at least one unactivated getter within said envelope capable of activation after said period of operation or storage;
   b. measuring said characteristic ratio after said period of operation or storage to determine the level of spectral photosensitivity of said layer; and
   c. activating said unactivated getter when the characteristic ratio of blue light photosensitivity is less than about 80%.

* * * * *